Nov. 21, 1939.    G. W. HEISE ET AL    2,180,955
PRIMARY BATTERY
Original Filed Aug. 17, 1934
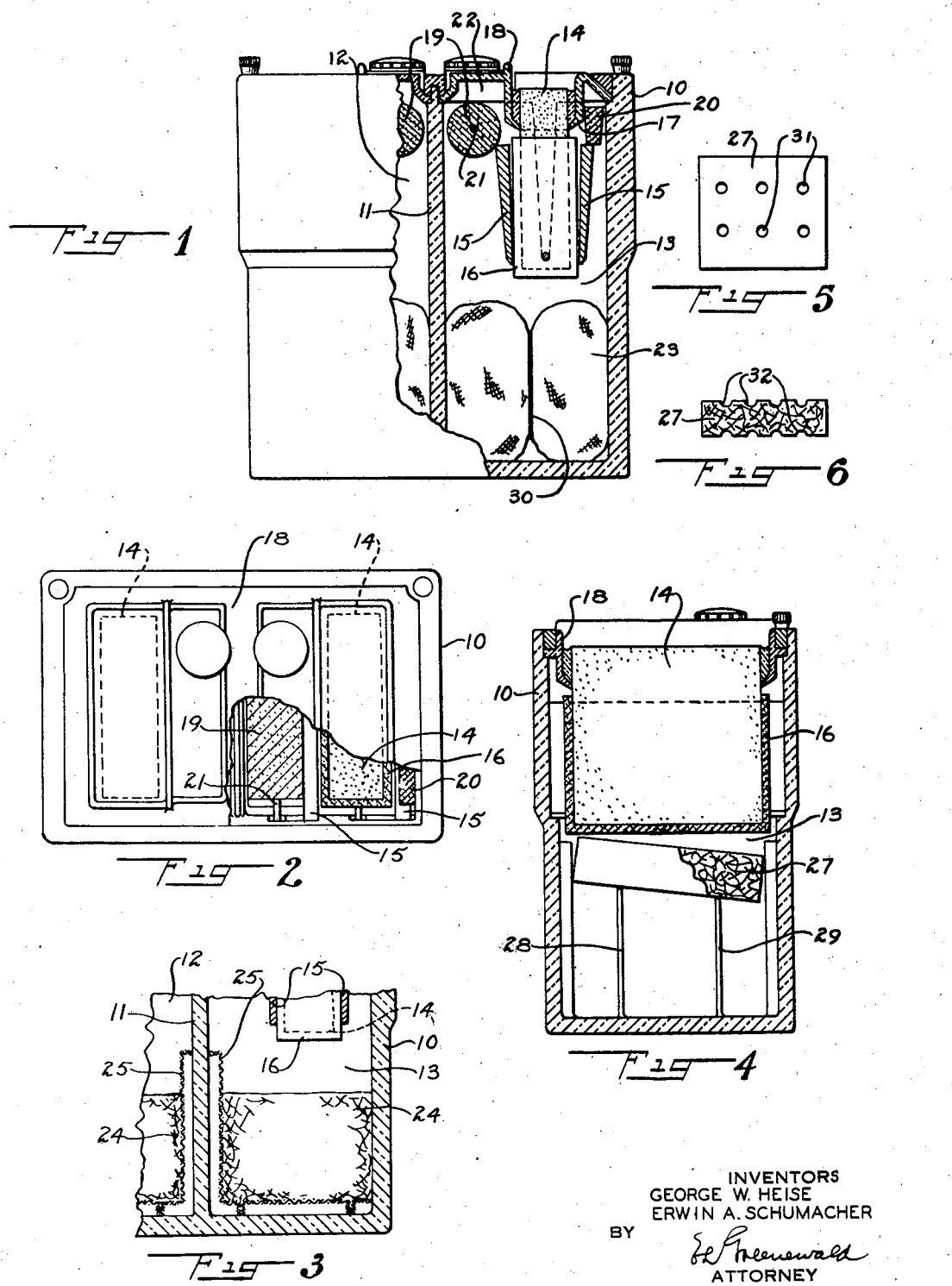
INVENTORS
GEORGE W. HEISE
ERWIN A. SCHUMACHER
BY
ATTORNEY Patented Nov. 21, 1939

2,180,955

UNITED STATES PATENT OFFICE 2,180,955

PRIMARY BATTERY

George W. Heise, Rocky River, and Erwin A. Schumacher, Lakewood, Ohio, assignors, by mesne assignments, to Union Carbide and Carbon Corporation, a corporation of New York Continuation of application Serial No. 740,215, August 17, 1934. This application November 12, 1938, Serial No. 239,950

28 Claims. (Cl. 136—114)

The invention relates to primary batteries and more particularly to such batteries having a soluble metal anode, such as zinc, a cathode, such as carbon, and a liquid caustic alkali electrolyte that tends to become exhausted by accumulation of deleterious substances, such as salts of the anode metal, or other metal compounds of the caustic alkali, formed therein, as, for example, by dissolution of the anodic metal during the action of the battery. The removal of such accumulation, wholly or in part, would tend to regenerate or recondition the electrolyte and thus reduce the quantity of the latter required for a battery of given capacity. In U. S. Patents 1,835,867, 1,835,- 868 and 1,864,652, the addition is cited of materials capable of reacting with such salts or compounds to release the caustic alkali and substantially insoluble in electrolyte which, added to battery electrolyte, will effect such removal. In 1,864,652, for example, the use of a reactant such as a layer or slurry of lime has been proposed, which, by reaction with anodically dissolved zinc, is converted to insoluble calcium zincate with regeneration of electrolyte. As the conversion proceeds through the mass, and the latter agglomerates and becomes crystalline, encrusting layers form, and diffusion becomes increasingly difficult and slow; so that, especially on heavy or continuous service, exhaustion of electrolyte may proceed more rapidly than its regeneration, and the lime addition may be only partially effective, thus limiting the quantity of addition that can be used to advantage. Therefore, one of the objects of this invention is to provide such batteries with improved means for removing dissolved substances from the electrolyte so that a far greater addition is made possible, and the corresponding batteries can be made smaller in physical size, lighter in weight, lower in cost, and more efficient in electrical output and utilization of active electrolyte material than previous units of the same capacity.

We have found that the material used to remove dissolved anode metal is more effective when a suitable electrolyte-permeable extender is distributed throughout the mass of reactant. Therefore, another object of the invention is to make available adequate paths to permit exhausted or partly exhausted electrolyte to contact with such material throughout its entire mass.

In cells of the deferred action type, designed to be activated by a single filling with water, and particularly when it is desirable to add the entire water requirement in a single installment, it is important that the reactant mass shall wet up rapidly, without occlusion or entrapment of air. Therefore, another object is to permit free contact between electrolyte and all sides of the reactant mass, by spacing the latter from the battery casing or container and providing channels for free circulation of liquid around the material and to prevent entrapment of air which otherwise would preclude the addition of all the water required for the activation of the cell by a single filling of water.

Such free contact between the electrolyte and mass of reactant or electrolyte regenerating material and electrolyte-permeable extender may provided by enclosing the mass in a suitable electrolyte-permeable container properly spaced from the battery casing; supporting the mass on a false bottom of electrolyte-permeable material; or by forming the mass of electrolyte regenerating material and electrolyte-permeable extender into a solid or a shaped body, such as a briquet, which may be supported or positioned in the battery out of contact with the casing and preferably out of contact with the anode and cathode of the cell. The exterior outline of said body preferably differs from the interior outline of said casing to permit contact of electrolyte with a greater area of said body and thereby increase the rate of wetting of said material; the positioning means within said casing cooperating with said body to hold the latter out of contact with said cathode and said anode. To maintain effectiveness, however, it is obviously essential that no substantial segregation of reactant and extender occur before a battery is placed in operation. For cells fully assembled and ready for use, with electrolyte in place, no special precautions are necessary, but for others a binder may be required to keep the reactant and extender from segregating. Therefore, another object is to provide such a binder and as it is generally undesirable to add foreign ingredients, a further object is to employ an electrolyte-forming material as a binder.

In cells designed for assembly in the field, for which battery parts or elements may separately be shipped, a water binder may effectively be used, but in batteries of the deferred action primary cell type, activated by the addition of water, such as those disclosed in U. S. Patent No. 1,924,314, containing a solid electrolyte-forming ingredient which may be in the form of a casting of caustic alkali, a water bound material is not advisable since the moisture or vapor would tend to disintegrate the casting. Therefore, a further object is to provide a material which is compatible with the other battery elements, and particularly a binder having a vapor pressure equal to or slightly lower than that of the solid electrolyte-forming material.

A further object is to provide the addition material in the form of a self-contained element so held in place in the cell casing as to be normally out of contact with the electrodes thereof to facilitate handling and the proper orientation in the battery during storage and shipment. These and other new and novel features and objects of the invention will be apparent from the following specification and the accompanying illustration in which:

Fig. 1 is a side view of a battery embodying our invention with a portion of the outer casing broken away to show the interior structure;

Fig. 2 is a top view of the battery shown in Fig. 1 with a portion of the outer casing also broken away to show the interior structure;

Fig. 3 is a fragmentary view showing the lower portion of a cell such as that shown in Fig. 1 in which the regenerating material is in the form of a slurry which is carried by a permeable support spaced from the bottom and side wall of the cell casing;

Fig. 4 is an end view of the battery shown in Fig. 1 with a portion of the end wall broken away to show a cell in which the regenerating material is a shaped body in the form of a briquet suitably spaced from the container;

Fig. 5 is a top view of a briquet provided with holes therein to facilitate rapid solution thereof; and Fig. 6 is a sectional view of a briquet provided with indentations to facilitate rapid solution thereof.

Our improvement in the means and method of removing dissolved substances from battery electrolyte is based on the discovery that various extenders may be mixed with a reactant such as lime to form masses which are sufficiently penetrable by electrolyte to ensure increased utilization efficiency. Materials such as asbestos and paper may be used as extenders with good effect. Preferred substances are the finely divided cellulosic materials such as those known commercially as cotton flock, alpha cellulose fluff, and the like, their immediate advantage being due to the greater quantity and distribution of lime afforded by equal quantities of extender.

A simple mixture of lime and cellulosic extender may be employed in some cases such as, for example, when the mixture is to be used in a battery immediately, but when the mix must be handled or shipped there is considerable segregation, the lime separating out and the extender becoming correspondingly less effective. We have found that this defect may be overcome by moistening the extender which, when damp, will pick up and hold lime in well distributed form.

As already indicated, plain water may be used to moisten the extender when the handling and shipping of damp material offers no disadvantage, as in railway signal cells of orthodox type, but in fully assembled units, such as air depolarized cells of the water activated type, a water-bound mix is undesirable because of the solvent and disintegrating effect of water vapor on the solid electrolyte ingredient. Asbestos, which shows comparatively little segregation when mixed dry with lime in suitable proportions, may here be used to advantage. When a binder is indicated, as with cellulose, it should be of a type which does not deleteriously affect battery action, and which, if containing water, has a vapor pressure preferably somewhat lower, and in no case substantially exceeding that of the solid electrolyte ingredient.

A suitable binder may consist of a salt with water of crystallization, such as, for example, sodium sulfate, alum, or the like. Such a salt may be used in dehydrated form in a mixture with lime and cellulose, and it will take up water added as water of crystallization, thus serving as a binder. However, since it is generally inadvisable to add foreign ingredients to battery electrolyte, our preferred binder is the same material as the electrolyte ingredient, for example, a hydrated caustic soda of the same or slightly lower water concentration than that of the main casting.

The binder may be added as a solution and mixed at a temperature above its melting point which may be about 60° C. to 65° C. A preferred method, however, is to mix the dry lime, fluff and water, then mix in finely divided caustic soda. For a battery cell having an output of from 600 to 750 ampere hours a typical mix composition that is satisfactory may be as follows:

| | | |
|---|---|---|
| Cellulose fluff | grams | 22 |
| Lime (Ca(OH)$_2$) | do | 300 |
| Caustic soda (NaOH) | do | 155 |
| Water | cc | 60 |

This material is formed into a solid mass, such as a briquet or packed in bags and will be used as hereinafter described.

This invention materially increases the efficiency of batteries of the type described and the extent of the improvement is shown by the following examples. In batteries having a capacity of 750 ampere hours this invention has enabled the volume of electrolyte to be reduced over one-third, from 3600 cc. for batteries with lime alone to 2250 cc. for batteries with lime and an extender. Stated in another way, batteries of this type in which no lime is used may require from 7 to 8 cc. of 20 per cent electrolyte for each ampere hour of rated capacity. With simple lime addition the electrolyte requirement in a commercial battery has been reduced to about 5 cc. per ampere hour, while with the lime-cellulose mix herein disclosed only 3 cc. or less per ampere hour is required. Therefore, batteries of a given output may be made smaller in size, lighter in weight, and lower in cost not only due to reduced size but because cheap lime replaces more expensive caustic soda.

Furthermore, this invention greatly decreases the inconvenience and expense of making renewals. In orthodox caustic soda cells there is normally much crystallization of zinc complexes from exhausted electrolyte on the walls of the container. In cells that are thrown away when exhausted this is of no particular moment, but in cells of the railway signal type in which the container is used repeatedly, the formation of insoluble adherent crystalline deposits on the walls and bottom of the battery jars adds greatly to the inconvenience and expense of making renewals. When simple lime additions are used the crystalline reaction product or precipitate is probably even more difficult to remove, but with the lime cellulose addition, on the contrary, the mass remains relatively non-adherent and can be more readily removed after cell exhaustion leaving the container comparatively clean and free from incrustations.

In Fig. 1 we show one embodiment of our invention as applied to an air depolarized battery comprising two cells such as may be used to supply "A" current to battery operated radio sets. This battery comprises an outer casing 10 divided by a partition 11 into two compartments 12 and 13 each serving as a cell of the battery. Within the battery are electrodes such as a carbon electrode or cathode 14 and zinc electrodes or anodes 15; the zinc electrodes 15 are preferably placed on opposite sides of the carbon electrode. Surrounding the carbon electrode is a cast of hydrated caustic soda 16 which serves to protect it from the water which is added to activate the battery. Upon solution this caustic soda forms a part of the electrolyte.

Since it is desirable to protect the part of the carbon electrode above the electrolyte level, the cover 18 of the battery is provided with a depending portion 17 which surrounds the upper portion of the carbon electrode and extends downward below the electrolyte level. Auxiliary casts of electrolyte-forming material 19 and 20 serve to ensure the rapid formation of concentrated electrolyte as disclosed in U. S. Patent No. 2,077,561, dated April 20, 1937. The cast of electrolyte-forming material 19 is supported by a wire 21 which afterwards serves as a means for indicating the proper solution level. In order to ensure that the proper amount of water is added we may provide an auxiliary water chamber 22, as is more particularly disclosed in U. S. Patent No. 2,077,561, dated April 20, 1937.

Near the bottom of the cell is the regenerating material or reactant mixture having the composition set forth above. This material is enclosed in a suitable container such as a sack or wrapping 23 of pervious or absorbent material such as cheese cloth, mosquito net, or like material. In order to ensure that the water added may penetrate rapidly about the mass of regenerating material it is desirable that suitable fluid channels between the reactant mixture and the battery casing be provided. This also provides means for the escape of air and for circulation during the active life of the battery. Such channels may most suitably be provided by constricting the bag or container by a binding or wrapping 30. This material may rest on the bottom of the battery casing or on a suitable support above the bottom thereof or rest loosely upon a suitable false bottom or support of pervious material 25 as shown in Fig. 3. This support may be of gauze, wire-screen or perforated metal or may consist of separate members as the members 28 or 29, as shown in Fig. 4. In all cases means should be provided for allowing the electrolyte, or the water which subsequently becomes a part of the electrolyte, to circulate around the mass of regenerative solid. Instead of enclosing the material in a container it may be molded into a briquet. This is particularly advantageous in such cells as railway signal cells which are subject to reuse. The briquet may be formed by molding a slurry of lime, cellulose and water as set forth above with or without an admixture of electrolyte-forming material. This material is filtered, pressed, shaped and dried. The briquet may be reenforced with wire or otherwise to prevent disintegration. If the briquet is not wet at a sufficiently rapid rate the outer glazed surface may be removed by abrasion and the surface area enlarged by scratching or abrading the outer surface of the briquet or providing them with holes or indentations.

These briquets 27 would be slightly smaller in size than the inside of the cell compartments and may be provided with openings 31 therethrough, as shown in Fig. 5, or indentations 32, as shown in Fig. 6, to increase the surface area and to ensure rapid wetting of said surface. The briquet is preferably elevated above the bottom of the battery by positioning means, such as suitable supports 28 and 29. These supports should be so arranged that the bottom of the briquet is inclined so that air bubbles will not be entrapped under the briquet. The supports 28 and 29 may be of any suitable form and may be separated from the battery casing 10 or may be integral therewith, extending from the sides or upward from the bottom. The arrangement is preferably such that the reconditioning means and extender forms a mass, the outer contour of which does not conform to a single plane or to a uniformly curved surface so as to permit free access of said liquid electrolyte to said mass without the entrapment of air.

Another suitable position for the reactant mixture is at the very top of the battery, as for example, around the liquid level indicator wire 21 in which case it may be possible to eliminate the auxiliary casting wholly or in part, or the entire casting 16 around the electrode assembly may be a caustic-lime-extender composition.

Although lime is given throughout the specification as the preferred substance for removing deleterious materials from a battery solution, this substance is given merely as an example as other substances may be used such, for example, as barium hydroxide or a base-exchange material such as bentonite or a zeolite, and although dissolved zinc is given as one of the deleterious materials removed from the solution, other materials may be removed such, for example, as carbonates.

Various changes may be made in the size, shape and relative arrangement of the component parts of the battery, and other similar and equivalent materials may be substituted for those defined without departing from the scope of the invention which is a decided improvement in primary batteries.

We claim:

1. In a primary battery of the type having a liquid electrolyte that tends to become exhausted by substances formed therein during the action of the battery; an electrolyte-forming solid material within said battery; a mass of material within said battery for removing said substances from solution comprising a mixture of a reactant, an extender, and a binder of said electrolyte-forming material.

2. In a primary battery of the type having a liquid electrolyte that tends to become exhausted by substances formed therein during the action of the battery; a hydrated electrolyte-forming solid material within said battery; and a mass of material within said battery for removing said substances from solution comprising a reactant, an extender, and a hydrated binder having a vapor pressure not substantially exceeding that of said electrolyte-forming material.

3. In a primary battery of the type having a liquid electrolyte that tends to become exhausted by substances formed therein during the action of the battery; an electrolyte-forming solid material within said battery composed of sodium hydroxide in hydrated form; and a mass of material within said battery for removing said substances from solution comprising a mixture of a reactant composed of lime, an extender composed of cellulose fluff, and a binder composed of said electrolyte-forming material.

4. In a primary battery of the type having a liquid electrolyte that tends to become exhausted by substances formed therein during the action of the battery; a cast of hydrated electrolyte-forming material within said battery; and a briquet within said battery for removing said substances from solution comprising a reactant, an extender, and a hydrated binder of said electrolyte-forming material having a vapor pressure equal to or below that of said cast.

5. In a primary cell of the type having a cathode, a metal anode, and a freely circulating liquid caustic alkali electrolyte that tends to become exhausted by the formation of compounds of the anode metal; a mass of solid electrolyte reconditioning material in contact with said electrolyte to react with such compounds to release the caustic alkali; and an electrolyte-permeable extender distributed throughout said mass of reconditioning material to provide adequate paths therethrough for said electrolyte.

6. In a primary cell of the type having a cathode, a metal anode, and a liquid caustic alkali electrolyte that tends to become exhausted by the formation of compounds of the anode metal; a mass of material within said cell for reaction with such compounds to release the caustic alkali comprising a mixture of a non-depolarizing electrolyte reconditioning material and an extender consisting of one or more of the group of electrolyte-permeable materials consisting of asbestos, paper, cotton flock, and cellulose fluff.

7. In a primary cell of the type having a cathode, a metal anode, and a freely circulating liquid caustic alkali electrolyte that tends to become exhausted by the formation of compounds of the anode metal; a mass of material within said cell for reaction with such compounds to release the caustic alkali comprising a mixture of a non-depolarizing electrolyte reconditioning material and an extender composed of cellulose fluff.

8. In a primary cell of the type having a cathode, a metal anode, and a liquid caustic alkali electrolyte that tends to become exhausted by the formation of compounds of the anode metal; a mass of material within said cell but normally out of contact with said cathode and anode for reaction with such compounds to release the caustic alkali comprising a mixture of an electrolyte reconditioning material and an extender composed of asbestos in such proportion that there is substantially no segregation of the component parts.

9. In a primary cell of the type having a cathode, a metal anode, and a freely circulating liquid caustic alkali electrolyte that tends to become exhausted by the formation of compounds of the anode metal; a mass of material within said cell but normally out of contact with said cathode and anode for reaction with such compounds to release the caustic alkali comprising a mixture of a reactant, an extender, and a binder.

10. In a primary cell, in combination, a cathode; a metal anode; a liquid caustic alkali electrolyte which tends to become exhausted by the formation of compounds of the anode metal; a casing for said cathode, anode, and electrolyte; a shaped body within said casing, said body comprising material capable of reacting with such compounds to release caustic alkali, the exterior outline of said body differing from the interior outline of said casing to permit contact of electrolyte with a greater area of said body and thereby increase the rate of wetting of said material; and positioning means within said casing and cooperating with said body to hold the latter in place.

11. In a primary cell of the type having a cathode, a metal anode, and a liquid caustic alkali electrolyte that tends to become exhausted by the formation of compounds of the anode metal; a casing for said cell; a mass of material spaced from said cathode and anode within said cell for reaction with such compounds to release the caustic alkali; and a support for said mass within said cell spaced from the bottom of said casing and having one or more side walls spaced from the side of said casing to provide channels for said electrolyte between said casing and the side and bottom of said mass to insure the penetration of the electrolyte through the entire mass of such material.

12. In a primary cell of the type having a casing, a cathode, a metal anode, and a liquid caustic alkali electrolyte that tends to become exhausted by the formation of compounds of the anode metal; a mass of material spaced from said cathode and anode within said cell for reaction with such compounds to release the caustic alkali; and means for increasing the rate of wetting of said material without entrapment of air therein comprising a container for said mass having an outline different from that of the interior of said casng to provide channels for said electrolyte between said casing and said mass.

13. A primary cell comprising a container, a cathode and a metal anode within said container, a caustic alkali electrolyte within said container, said anode going into solution in said electrolyte, said electrolyte tending to become exhausted by the formation of compounds of the anode metal, a mass of material within said container for reaction with such compounds to release the caustic alkali, said mass of material being formed into a self-supporting coherent unit, and means for positioning said mass of material in such a manner that it will be wholly spaced from said cathode and anode and in part spaced from the walls of said container whereby electrolyte may circulate freely about said mass.

14. In a primary deferred action cell adapted for activation by a single filling of water; a cast of electrolyte-forming material within said cell; a briquet of electrolyte regenerating material within said cell; and supports for said briquet having supporting surfaces at different heights to support said briquet at an angle from the horizontal to prevent entrapment of air underneath said briquet which would prevent the addition of all the water required for activation at a single filling.

15. A deferred action primary cell adapted for activation by a single filling of water, said cell comprising, in combination, electrodes; a casing for said electrodes; a cast of electrolyte-forming material within said casing; a briquet within said casing and normally spaced from said electrodes and said cast, said briquet comprising a mass of electrolyte regenerating material and an electrolyte-permeable extender distributed throughout said mass; and positioning means for holding said briquet within said casing, the form of said briquet and said positioning means cooperating to hold said briquet normally out of contact with said electrodes and said cast and to provide channels for the passage of electrolyte between said casing and said briquet to prevent entrapment of air which otherwise would preclude the addition of all the water required for the activation of the cell by a single filling of water.

16. In a primary deferred action cell adapted for activation by a single filling of water to form an electrolyte that tends to become exhausted by substances formed therein during the action of the battery; a mass of reconditioning material within said battery for removing said substances from solution; an electrolyte-permeable material distributed throughout said mass to facilitate contact between said electrolyte and all parts of said reconditioning material; a soluble binder distributed throughout said mass to prevent segregation of the components of said mass; positioning means for said mass comprising a container therefor, and means for constricting the central portion of said container and said mass to provide a fluid channel to facilitate the solution of said binder and to avoid entrapment of air by said mass which would prevent all the water required for activation from being added at a single filling.

17. In a deferred action primary cell having a cathode, a metal anode and a cast of caustic alkali electrolyte-forming material within a casing and adapted for activation by the addition of water to form a caustic alkali electrolyte that tends to become exhausted by the formation of compounds of the anode metal; a briquet normally spaced from said cathode and anode within said cell and composed of a material for reaction with such compounds to release the caustic alkali, together with a cellulosic extender to provide an outer surface of said briquet readily wetted by said water to facilitate ingress of liquid thereinto.

18. In a deferred action primary cell having a cathode, a metal anode and a cast of caustic alkali electrolyte-forming material within a casing and adapted for activation by the addition of water to form a caustic alkali electrolyte that tends to become exhausted by the formation of compounds of the anode metal; a briquet normally spaced from said cathode and anode within said cell and composed of a material for reaction with such compounds to release the caustic alkali, together with an extender consisting of cellulose fluff to render said briquet electrolyte-permeable and to facilitate rapid ingress of liquid.

19. In a deferred action primary cell of the type having a cathode, a metal anode, and a liquid caustic alkali electrolyte that tends to become exhausted by the formation of compounds of the anode metal; a mass of material spaced from said cathode and anode within said cell comprising a reconditioning material for reaction with such compounds to release the caustic alkali and an extender; and means for increasing the rate of wetting of said material without entrapment of air therein comprising an electrolyte-permeable container for said mass.

20. In a deferred action primary cell of the type having a casing, a cathode, a metal anode, and a liquid caustic alkali electrolyte that tends to become exhausted by the formation of compounds of the anode metal; a mass of material spaced from said cathode and anode within said cell for reaction with such compounds to release the caustic alkali; means for increasing the rate of wetting of said material without entrapment of air therein comprising means for positioning said mass in said cell comprising a bibulous container, and means for providing a fluid channel around said mass and giving it an outline different from that of the interior of said casing comprising a binding around said container forming a constricted central portion.

21. In a deferred action primary cell having a cathode and a metal anode and adapted for activation by a single filling of water to form a caustic alkali electrolyte that tends to become exhausted by the formation of compounds of the anode metal; a loose slurry of reconditioning material within said cell for reaction with such compounds to release the caustic alkali comprising a reactant, an electrolyte-permeable material distributed throughout said slurry to facilitate contact between said exhausted or partially exhausted electrolyte and said reactant, and a binder distributed throughout said slurry to prevent segregation of the component parts thereof.

22. In a deferred action primary cell of the type having a cathode, a metal anode and a liquid caustic alkali electrolyte that tends to become exhausted by the formation of compounds of the anode metal; a casing for said battery; a mass of material within said cell for reaction with such compounds to release the caustic alkali comprising a mixture of a reactant, and an extender for providing electrolyte paths through said reactant; means for maintaining said mixture against segregation while said cell is inactive, for increasing the rate of wetting of said mass, and also the freedom from air entrapment during activation, comprising a container for said mass having an outline different from that of the interior of said casing to provide channels for said electrolyte between said casing and substantially all sides of said mass.

23. A composition of matter useful for reconditioning a primary cell liquid caustic alkali electrolyte that tends to become exhausted by the formation of metal compounds of the caustic alkali, comprising the combination of reconditioning means capable of reaction with such compounds to release the caustic alkali, and an extender for providing diffusion paths through said reconditioning means, said reconditioning means and extender forming a mass the outer contour of which does not conform to a plane or uniformly curved surface so as to permit the free flow of said liquid electrolyte about all sides of said mass.

24. A composition of matter useful for reconditioning a primary cell caustic alkali electrolyte that tends to become exhausted by the formation of metal compounds of the caustic alkali, comprising the combination of reconditioning means capable of reaction with such compounds to release the caustic alkali, electrolyte-permeable means for providing adequate diffusion paths for said electrolyte to all parts of said reconditioning means, and binding means consisting of solid electrolyte-forming material for preventing segregation of said aforementioned means.

25. A composition of matter useful for reconditioning a primary cell liquid caustic alkali electrolyte that tends to become exhausted by the formation of metal compounds of the caustic alkali, comprising the combination of reconditioning means capable of reaction with such compounds to release the caustic alkali together with an extender for providing diffusion paths through said reconditioning means, said reconditioning means and extender forming a mass, the outer contour of which does not conform to a single plane or to a uniformly curved surface so as to permit free access of said liquid electrolyte to said mass without the entrapment of air.

26. In a primary deferred action cell of the type having a caustic alkali electrolyte, adapted for activation by a single filling of water; an electrode assembly comprising a casting of a caustic-lime-extender composition; a cathode; and an anode; said casting being positioned between and supported by said cathode and anode in spaced relation to the bottom and side walls of the cell so that entrapment of air is obviated when said cell is filled with water.

27. An article of manufacture useful for reconditioning a primary cell liquid caustic alkali electrolyte that tends to become exhausted by formation of metal compounds of the caustic alkali, comprising a mixture of slurry of lime and cotton flock compressed to provide a briquet adapted to be positioned within the cell at least until wetted by the electrolyte.

28. An article of manufacture as set forth by claim 27, wherein the briquet is provided with strengthening means to prevent disintegration until wetted by the electrolyte.

GEORGE W. HEISE.
ERWIN A. SCHUMACHER.